US006310419B1

(12) United States Patent
Wood

(10) Patent No.: US 6,310,419 B1
(45) Date of Patent: Oct. 30, 2001

(54) RESISTOR ARRAY DEVICES INCLUDING SWITCH CONTACTS OPERATED BY MICROELECTROMECHANICAL ACTUATORS AND METHODS FOR FABRICATING THE SAME

(75) Inventor: Robert L. Wood, Cary, NC (US)

(73) Assignee: JDS Uniphase Inc., Ontario (CA)

( * ) Notice: Subject to any disclaimer, the term of this patent is extended or adjusted under 35 U.S.C. 154(b) by 0 days.

(21) Appl. No.: 09/542,142

(22) Filed: Apr. 5, 2000

(51) Int. Cl.[7] ................................................. H01H 37/04
(52) U.S. Cl. ............................................ 310/306; 310/307
(58) Field of Search ..................................... 310/306, 307

(56) References Cited

U.S. PATENT DOCUMENTS

| | | | |
|---|---|---|---|
| 4,788,415 | * 11/1988 | Whipple | 219/508 |
| 5,578,976 | 11/1996 | Yao | 333/262 |
| 5,834,975 | 11/1998 | Bartlett et al. | 330/278 |
| 5,870,518 | 2/1999 | Haake et al. | 385/90 |
| 5,872,489 | 2/1999 | Chang et al. | 331/179 |
| 5,880,921 | 3/1999 | Tham et al. | 361/233 |
| 5,909,078 | 6/1999 | Wood et al. | 310/307 |
| 5,914,801 | 6/1999 | Dhuler et al. | 359/230 |
| 5,955,817 | 9/1999 | Dhuler et al. | 310/307 |
| 5,959,516 | 9/1999 | Chang et al. | 334/14 |
| 5,962,949 | 10/1999 | Dhuler et al. | 310/307 |
| 5,994,816 | 11/1999 | Dhuler et al. | 310/307 |

FOREIGN PATENT DOCUMENTS

| | | | |
|---|---|---|---|
| 0751546A2 | 1/1997 | (EP) | H01H/59/00 |
| 0751546A3 | 5/1997 | (EP) | H01H/59/00 |
| 3-142386-A | * 6/1991 | (JP) | 310/306 |
| 11-162310-A | * 6/1999 | (JP) | 310/306 |

\* cited by examiner

*Primary Examiner*—Thomas M. Dougherty
(74) *Attorney, Agent, or Firm*—Myers Bigel Sibley & Sajovec

(57) ABSTRACT

Resistor networks, digital potentiometers and microelectromechanical structures that include a plurality of resistors selectable by a plurality of microelectromechanical actuators are provided. More particularly, a thermal relay type of actuator is provided as a switch which may selectively control which of the plurality of resistors is connected. In one particularly advantageous embodiment, the heater for the thermal relay and the plurality of resistors are formed from a common layer of the integrated circuit structure, such as a doped polysilicon layer, which may simplify the manufacturing process. Preferably, a thermal arched beam actuator is utilized in combination with film resistors to provide an integrated circuit device suitable for applications such as digital potentiometers.

27 Claims, 8 Drawing Sheets

RESISTOR ARRAY DEVICES INCLUDING SWITCH CONTACTS OPERATED BY MICROELECTROMECHANICAL ACTUATORS AND METHODS FOR FABRICATING THE SAME

FIELD OF THE INVENTION

This invention relates to microelectronic devices, and more particularly to microelectronic resistor arrays and methods for fabricating the same.

BACKGROUND OF THE INVENTION

Resistor arrays are used for a variety of applications including digital potentiometers. Such arrays may be generated from discrete resistors or from commercially available integrated circuits including a plurality of resistors. The resistors are typically coupled with electrical relays or switches, such as dual in-line package (DIP) switches, to provide a selectable range of resistance values. Furthermore, controllable switches rather than manual switches may be utilized to provide control over the selection of the resistor values to a processor or other control device, typically digitally. Such a digital potentiometer may be useful, for example, in instrument setup, tuning, calibration or wherever a resistor value needs to be changed remotely in a circuit. However, combining metal to metal contact switches with discrete resistors, while generally providing high isolation and low insertion losses, typically requires significant circuit board space as compared with integrated circuit type devices.

Microelectromechanical systems (MEMS) have been developed as alternatives to conventional electromechanical devices, such as relays, actuators, valves and sensors. MEMS devices are potentially low-cost devices, due to the use of microelectronic fabrication techniques. New functionality also may be provided, because MEMS devices can be much smaller than conventional electromechanical devices.

It has been proposed to utilize particular MEMS devices integrated with a variety of other electrical components. U.S. Pat. No. 5,880,921 to Tham et al. is directed to a monolithically integrated switched capacitor bank using MEMS technology. U.S. Pat. No. 5,834,975 to Bartlett et al. discusses an integrated, variable gain microwave frequency power amplifier which includes a number of individual amplifier stages having outputs connected to MEMS switches. U.S. Pat. No. 5,872,489 to Chang et al. is directed to an integrated, tunable inductance network with a number of fixed inductors fabricated on a common substrate along with a switching network including MEMS switches. Similarly, it is known to provide a resistor array in combination with MEMS switches. Notwithstanding the above-described advances and suggestions, there continues to be a need for selectable resistor networks having a small footprint and suited to large scale production.

SUMMARY OF THE INVENTION

The present invention provides resistor networks, digital potentiometers and microelectromechanical structures that include a plurality of resistors selectable by a plurality of microelectromechanical actuators. More particularly, a thermal relay type of actuator is provided as a switch which may selectively control which of the plurality of resistors is connected. The heater for the thermal relay and the plurality of resistors may be formed from a common layer of the integrated circuit structure, such as a doped polysilicon layer, which may simplify the manufacturing process. Preferably, a thermal arched beam actuator, for example as described in U.S. Pat. No. 5,909,078, is utilized in combination with film resistors to provide an integrated circuit device suitable for applications such as digital potentiometers.

In embodiments of the present invention, the integrated circuit resistor network includes a plurality of resistors and a plurality of switches, each of the switches being electrically coupled in series with an associated one of the plurality of resistors. The resistor network further includes a plurality of microelectromechanical actuators, each of the microelectromechanical actuators being coupled to one of the plurality of switches, and a controller electrically coupled to the plurality of microelectromechanical actuators that selectively activates at least one of the plurality of microelectromechanical actuators to toggle the associated one of the switches coupled to the at least one of the plurality of microelectromechanical actuators. In one embodiment, the microelectromechanical actuators are thermal relays including a heater element comprising a region of a resistive material on an integrated circuit substrate and the plurality of resistors are film resistors each comprising a region of the resistive material on the integrated circuit substrate. The resistive material is preferably polysilicon and more preferably the resistors are thin film doped polysilicon resistors.

In further embodiments, respective ones of the plurality of resistors have a resistance value stepped by a factor of two from another of the plurality of resistors. Preferably, each of the plurality of resistors provides a set of associated resistance values stepped by factors of two from a base resistance value. The base resistance value may be between about 20 ohms and about 300 ohms. Each of the doped polysilicon film resistors may include a number of resistor squares of a polysilicon sheet having a sheet resistance value (rho) so as to provide a desired resistance value. In one embodiment, at least one of the plurality of resistors includes a plurality of matched polysilicon resistor elements.

In other embodiments of the present invention, the microelectromechanical actuators are thermal relays including an integrated circuit substrate and spaced apart supports on the integrated circuit substrate. A beam extends between the spaced apart supports that expands upon application of heat thereto to thereby cause displacement of the beam between the spaced apart supports. In one embodiment, the integrated circuit substrate defines a reference plane and the beam is an arched beam which extends between the spaced apart supports and which expands upon application of heat thereto for movement parallel to the reference plane defined by the integrated circuit substrate. The thermal relays may further include a heater disposed on the integrated circuit substrate so as to underlie the arched beam and to be spaced apart from the arched beam. The heater may be adapted to heat the ambient surrounding the arched beam which, in turn, heats the arched beam to cause further arching of the beam as a result of thermal expansion thereof, to thereby cause displacement of the arched beam parallel to the reference plane defined by the integrated circuit substrate.

In further embodiments, the controller is coupled to the heater of each of the thermal relays to initiate heating of the arched beams so as to activate the corresponding one of the plurality of microelectromechanical actuators. The controller may output a select pulse that generates a current flow to activate the at least one of the plurality of microelectromechanical actuators. The resistor network may further include a latch circuit that maintains the activated at least one of the plurality of microelectromechanical actuators in an activated position. In one embodiment, the latch circuit outputs an electrostatic holding voltage that maintains the activated at least one of the plurality of microelectromechanical actuators in the activated position. The latch circuit may include a capacitor associated with each of the plurality of microelectromechanical actuators and the controller may have a plurality of latch outputs each of which is electrically coupled to one of the capacitors that initiates charging of the associated one of the capacitors to thereby output the electrostatic holding voltage.

In further embodiments of the present invention, a digital potentiometer integrated on an integrated circuit substrate is provided including a plurality of film resistors on the integrated circuit substrate and a plurality of microrelay switches on the integrated circuit substrate. A respective resistor and switch are coupled between first and second reference terminals of the digital potentiometer. A control circuit selectively activates one of the plurality of microrelay switches to provide a desired resistance between the first and second reference voltage pins of the digital potentiometer. The microrelay switches may be thermal relays including a heater element defined by a region of a resistive material on the integrated circuit substrate and the plurality of film resistors may also be defined by a region of the resistive material on the integrated circuit substrate. The control circuit may be coupled to a selection input of the digital potentiometer that designates one of the plurality of microrelay switches to activate.

In other embodiments, at least one of the microrelay swiches includes a first contact electrically coupled to a second end of an associated one of the plurality of thin film resistors. The second end is opposite a first end of the associated one of the plurality of thin film resistors that is coupled to the first reference terminal. A second contact may be electrically coupled to the second reference terminal. A third contact having a first position contacting the first and second contact and a second position displaced from the first and second contact is also included in the microrelay switch. In addition, a thermal arched beam microelectromechanical actuator is coupled to the third contact which has a first position in which the third contact is in its first position and a second position in which the third contact is in its second position. The heater element heats the thermal arched beam to move it between its first and second positions. The first position of the thermal arched beam microelectromechanical actuator may be an activated position and an electrostatic latch circuit may be provided that latches activated ones of the plurality of thermal arched beam microelectromechanical actuators in the activated position with the control circuit providing a latch control output coupled to the electrostatic latch circuit that designates one of the plurality of thermal arched beam microelectromechanical actuators to be latched.

In yet further embodiments of the present invention, a microelectromechanical structure including a resistor array is provided including an integrated circuit substrate. A plurality of thermal actuators and a resistive layer are provided on the integrated circuit substrate. The resistive layer defines a plurality of heaters, each of the heaters being associated with one of the plurality of thermal actuators and further defines a plurality of resistors of the resistor array, the plurality of resistors being electrically coupled to the thermal actuators. The microelectromechanical structure may further include a conductive layer on the integrated circuit substrate defining anchors associated with the thermal actuators and further defining moving switch elements of the thermal actuators and a contact layer on the resistive layer and electrically connected to the resistive layer. A trench may be provided between the heater and the integrated circuit substrate to provide thermal isolation therebetween.

In other embodiments of the present invention, a method of fabricating a microelectromechanical structure including a resistor array is provided. A resistive material layer is formed on an integrated circuit substrate to define a heater associated with a thermal relay and further defining a plurality of resistors of the resistor array. A conductive layer is formed on the integrated circuit substrate defining anchors associated with the thermal relay and further defining a moving switch element of the thermal relay. A contact layer is formed on the resistive material layer and electrically connected to the resistive material layer.

DETAILED DESCRIPTION OF PREFERRED EMBODIMENTS

Figure 1:
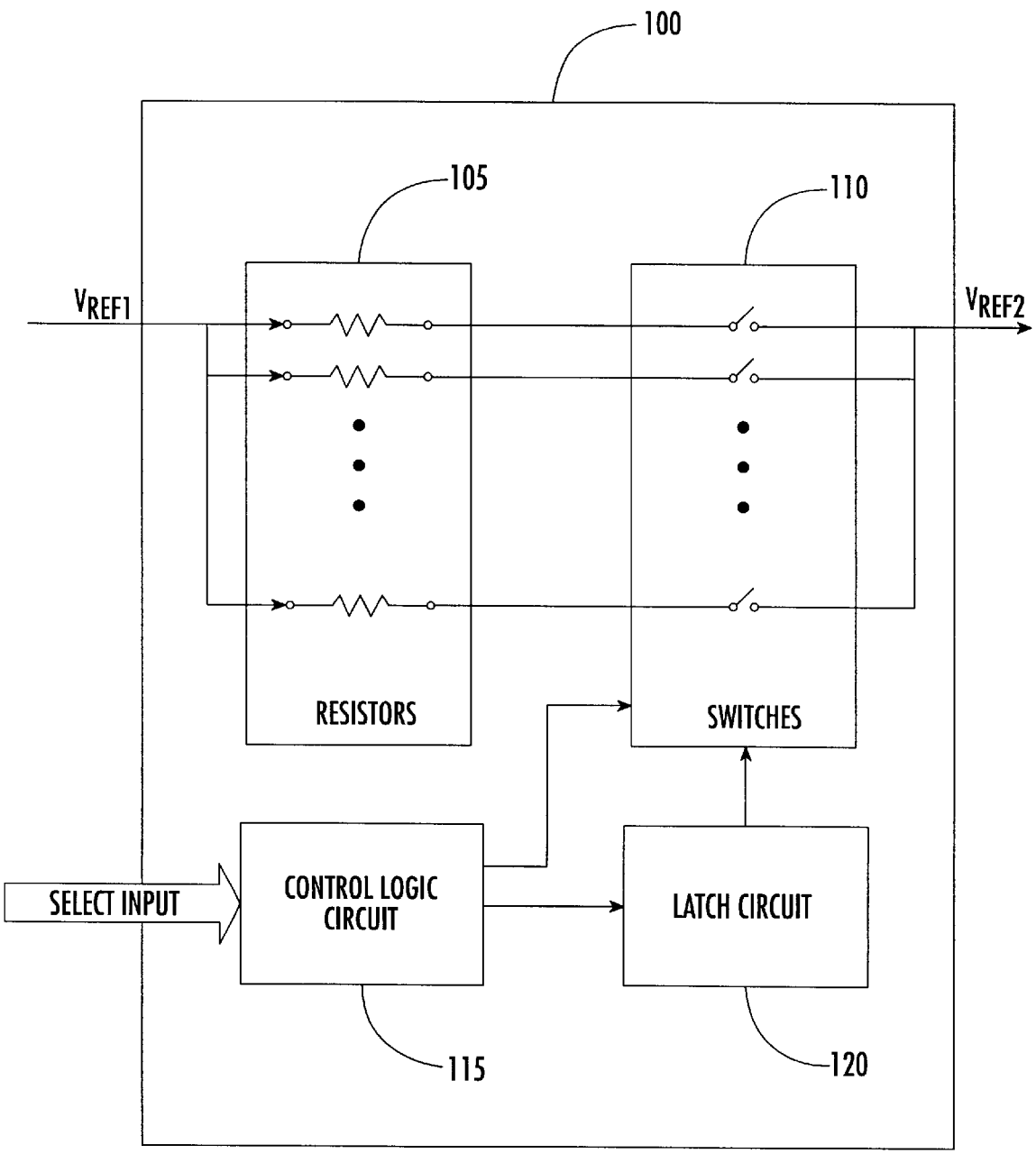
FIG. 1 is a schematic block diagram illustrating a resistor network according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that, when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the schematic block diagram illustration of FIG. 1, a microelectromechanical structure providing a resistor array according to embodiments of the present invention will now be described. As shown in the embodiment of FIG. 1 the resistor array is preferably formed on an integrated circuit substrate 100, more preferably, an integrated circuit substrate such as a Moncrystalline silicon substrate or a Semiconductor-on-Insulator (SOI) substrate. It includes a resistor array 105 including a plurality of resistors and a switch array (network) 110 including a plurality of switches. Each of the switches in the switch array 110 is electrically connected in series with an associated one of the plurality of resistors in the resistor array 105. However, it will be understood that more than one resistor may be connected to a switch and more than one switch can be connected to a resistor. Preferably, each of the switches in the switch array 110 is provided as a microrelay switch and, more particularly, a thermal relay switch. The microrelay switch includes conductive, preferably metal, contact elements and an associated microelectromechanical actuator for each of the switch elements. A preferred embodiment for a microrelay switch includes a thermal arched beam microelectromechanical actuator as will be described further later herein.

In addition to the serial connection between each of the resistors and an associated switch, the opposite end of each of the resistors in the resistor array 105 is connected to a first voltage reference input pin $V_{REF1}$. Similarly, the opposite end of each of the switches in the switch array 110 is coupled electrically to a second reference voltage pin $V_{REF2}$. However, it will be understood that multiple reference input and output pins may be provided. It also will be understood that the term "pins" is used generally herein to refer to any integrated circuit input/output terminal such as pads. The microelectromechanical structure further includes a control logic circuit (or controller) 115. The controller 115 is coupled to each of the microelectromechanical actuators in the switch array 110 and is configured to selectively activate one or more of the plurality of microelectromechanical actuators to set an associated one of the switch contacts which is coupled to the respective microelectromechanical actuator. As used herein, an active state of the actuator will be associated with a closed state of the associated switch. However, it is to be understood that the present invention is not so limited and encompasses configurations in which an active state of the actuator is associated with an open switch. Moreover, the controller 115 need not be coupled to each of the actuators as some of the resistors may be permanently latched on.

In the illustrated embodiment of FIG. 1, the control logic circuit receives a select input designating which of the respective switches should be activated. It will be understood, however, that a specified resistor value or other value may be provided by the select input and the controller 115 then may determine which of the respective switches should be activated. The embodiment illustrated in FIG. 1 further provides for latched switch control through a latch circuit 120. Both latched (bistable) embodiments and monostable embodiments will be described further later herein.

In one embodiment of the present invention, a total of sixteen resistor values are included in the resistor array 105. The resistor array 105 may be utilized to implement a digital potentiometer by selecting from a parallel set of sixteen integrated circuit based resistors using on-chip switches in the switch array 110. Preferably, a single metal to metal contact selects each resistor and provides the desired isolation between the control select inputs and the resistor array 105 while providing for a wide range of selectable resistance in a small form factor.

In a preferred embodiment, the resistors in the resistor array 105 comprise film resistors, more preferably thin film resistors, with values ranging from a few tens of ohms up to several mega-ohms stepped by a factor of two per channel (i.e. per resistor). Stated differently, each of the plurality of resistors in the resistor array 105 preferably is selected to provide a set of associated resistance values stepped by factors of two from a base resistance value. The base resistance value is preferably between about 20 ohms and about 300 ohms and more preferably between about 24 ohms and 240 ohms and most preferably is about 240 ohms.

It is expected that, in most applications, the precision of the individual resistor values will be less important than the accuracy of the ratios between succeeding steps. Digital potentiometer devices of this type are also typically used in a "set and forget" mode with each switch latched in its configured state. Furthermore, applications generally do not require the resistor array 105 to handle significant power (typically less than a few milliwatts). The present invention may support such requirements readily in an integrated circuit device suitable for use in a variety of formats including a surface mount type Small Outline Integrated Circuit (SOIC) package format or a dual in-line package (DIP). Preferably, the resistor array 105 and the switch array 110 are integrated on a single chip.

Figure 2:
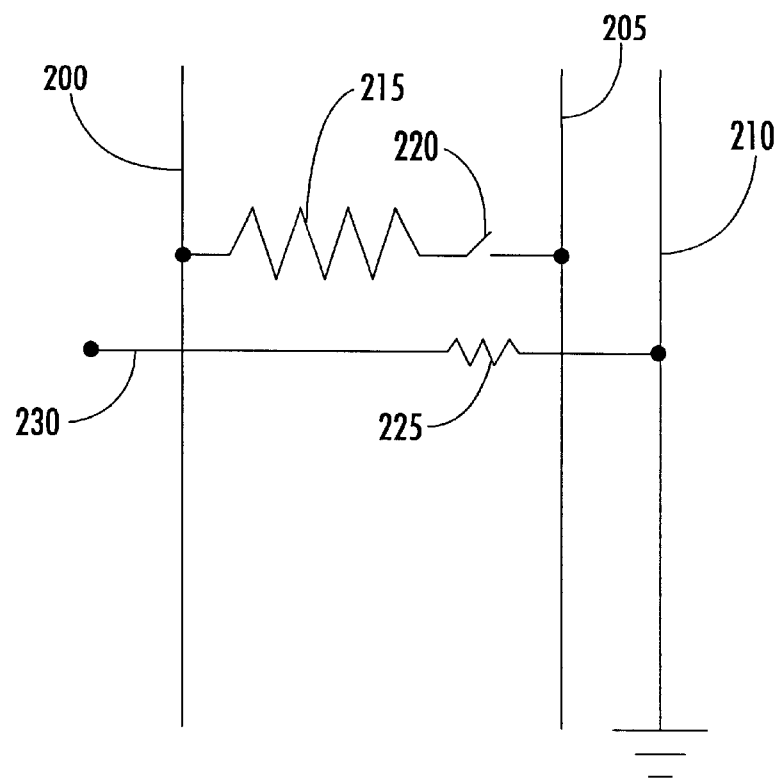
FIG. 2 is a schematic circuit diagram illustrating embodiments of a resistor network according to the present invention utilizing monostable switches.
Figure 3:
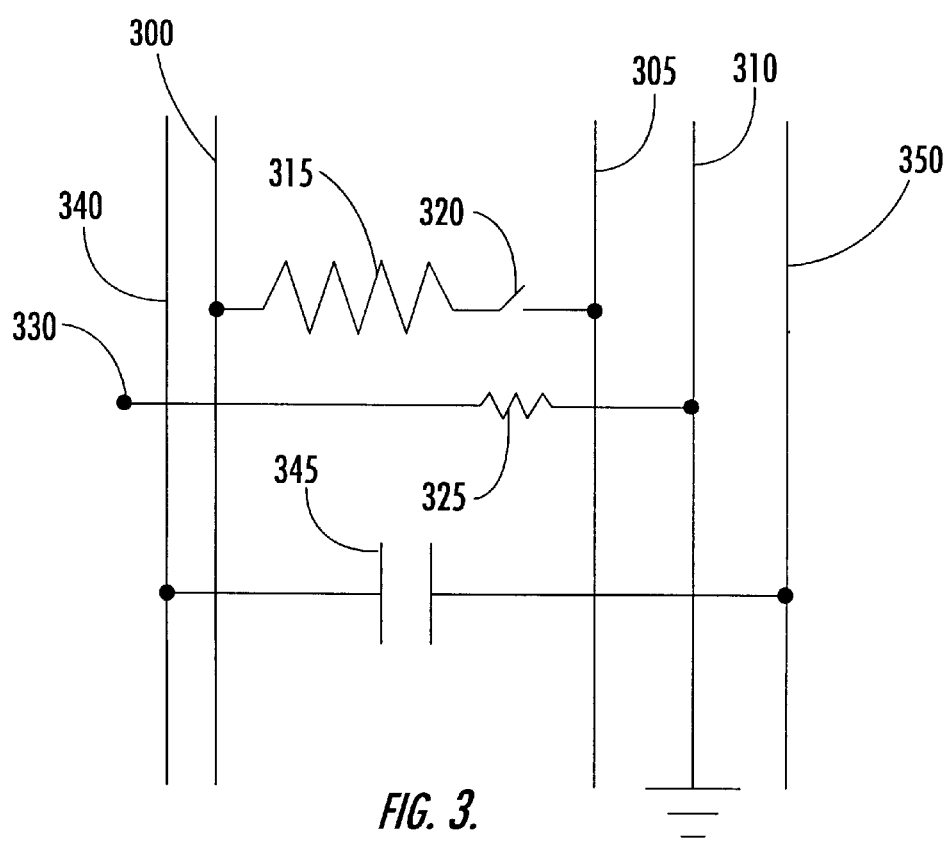
FIG. 3 is a schematic circuit diagram illustrating embodiments of a resistor network according to the present invention utilizing latchable switches.

Referring now to FIG. 2, the present invention will be further described with reference to a schematic illustration of a monostable resistor network according to an embodiment of the present invention. It is to be understood that FIG. 2 and FIG. 3 are merely for illustrative purposes to show the general relationship of the control signals from the control logic circuit 115 and the latch circuit 120 and are not intended to illustrate the actual physical layout of their respective components on an integrated circuit substrate. As shown in FIG. 2 a resistor array 105 global input 200 and a resistor array 105 global output 205 are provided. The input 200 corresponds to $V_{REF1}$ as described in FIG. 1 and the output 205 corresponds to $V_{REF2}$ as described with reference to FIG. 1. Illustrated resistor 215 represents one resistor element in the resistor array 105. The resistor 105 array is preferably a $2^N R_{network}$ resistor element where N may range, for example from 1 to 16 for a 16 element (channel) digital potentiometer resistor array.

The switch 220 is preferably a microelectromechanical structure including a microelectromechanical actuator such as a thermal relay opening and closing switch contacts. A control input 230 activates a resistive heater element 225 to activate the switch 220 to select the specific corresponding resistor 215.

As is shown in FIG. 2, isolation is provided through the use of both a separate control input 230 and a control reference voltage 210. For the illustrated embodiment of FIG. 2, the control reference voltage 210 is a global ground connection shared by each of the selectable resistor elements. Alternatively, a differential control signal could be provided. The control input 230 may, for example, be a 5 volt, 30 milliamp input. Each switch 220 is held in the closed state in the embodiment of FIG. 2 by continuous application of a DC current at the control input 230. Any one or more of the switches can be activated and the outputs of the successive switch controls may be tied together and grounded as shown for the global control output to ground 210.

A latched embodiment providing for bistable operation of the microrelay switches will now be described with reference to FIG. 3. The features identified by reference numerals 300 through 330 perform in substantially the same manner as was described previously with reference to the correspondingly numbered elements from the two hundred number series in FIG. 2 and will not be described further herein. However, the embodiment of FIG. 3 further includes a latch control circuit. The latch control circuit includes latch global inputs 340, 350. The electrostatic latching device 345, illustrated as a capacitor in FIG. 3, is electrically connected between the latch global inputs 340 and 350. The latch global inputs may be provided, for example, as a 15 volt reference signal 340 and a −15 volt reference signal 350.

While mechanical latches are suitable for use with the present invention, electrostatic latches are preferred. Electrostatic latches may be integrated with the microrelay switches to achieve stable operation while potentially maintaining a small device footprint. As seen in FIG. 3, latching the microrelay switches electrostatically for the illustrated embodiment uses an application of two drive signals, one to close the microrelay switch and a second to latch it in the activated or closed position. Advantageously, once latched, the control circuit utilized to close (activate) the switch may be deactivated so that it draws no further current (consumes no further power) and the switch will return to its deactivated (open) state only on removal of the latching voltage. The switch 320 is first closed by application of a request on the control input 330 driven by the control logic circuit 115 (FIG. 1). The global latch input 340 is subsequently applied. The control input 330 signal can then be removed while the switch remains in its closed position. It is to be further understood that, to reset a latched switch, the global latch signal is preferably deactivated to allow the microrelay switch 330 to return to its open position.

A latched embodiment of the present invention can simplify addressing as only a single input/output pair may be required to set the state of the latch. However, the global latch configuration illustrated in FIG. 3 may require that each of the respective resistors 315 be reconfigured whenever the resistor array 105 is reconfigured. Internal or external resistors are preferably provided at the global latch input 340 to provide for discharge of the electrostatic latching capacitance 345 for reconfiguration of the resistor array 105. This allows the electrostatic latching capacitance 345 to discharge rapidly upon deactivation of the latching voltage. Without the discharging resistors, it may take longer to reset the resistor array. Note that in this embodiment, it is only on discharge of the electrostatic latching voltage that the state of the switch (open or closed) may be determined based solely upon whether the microrelay switch 320 itself has an activate or deactivate control input.

Figure 4A:
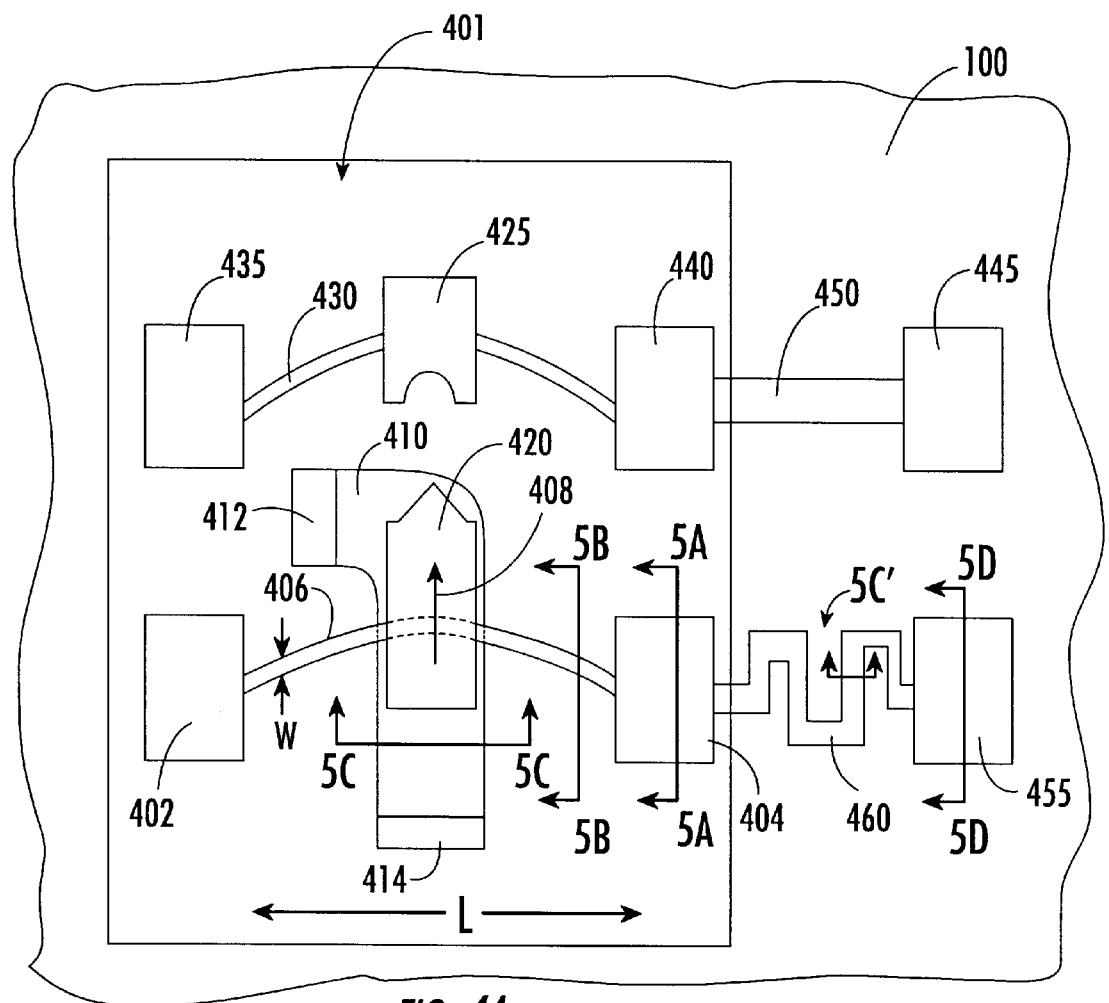
FIGS. 4A and 4B are top views of a resistor network according to embodiments of the present invention.
Figure 4B:
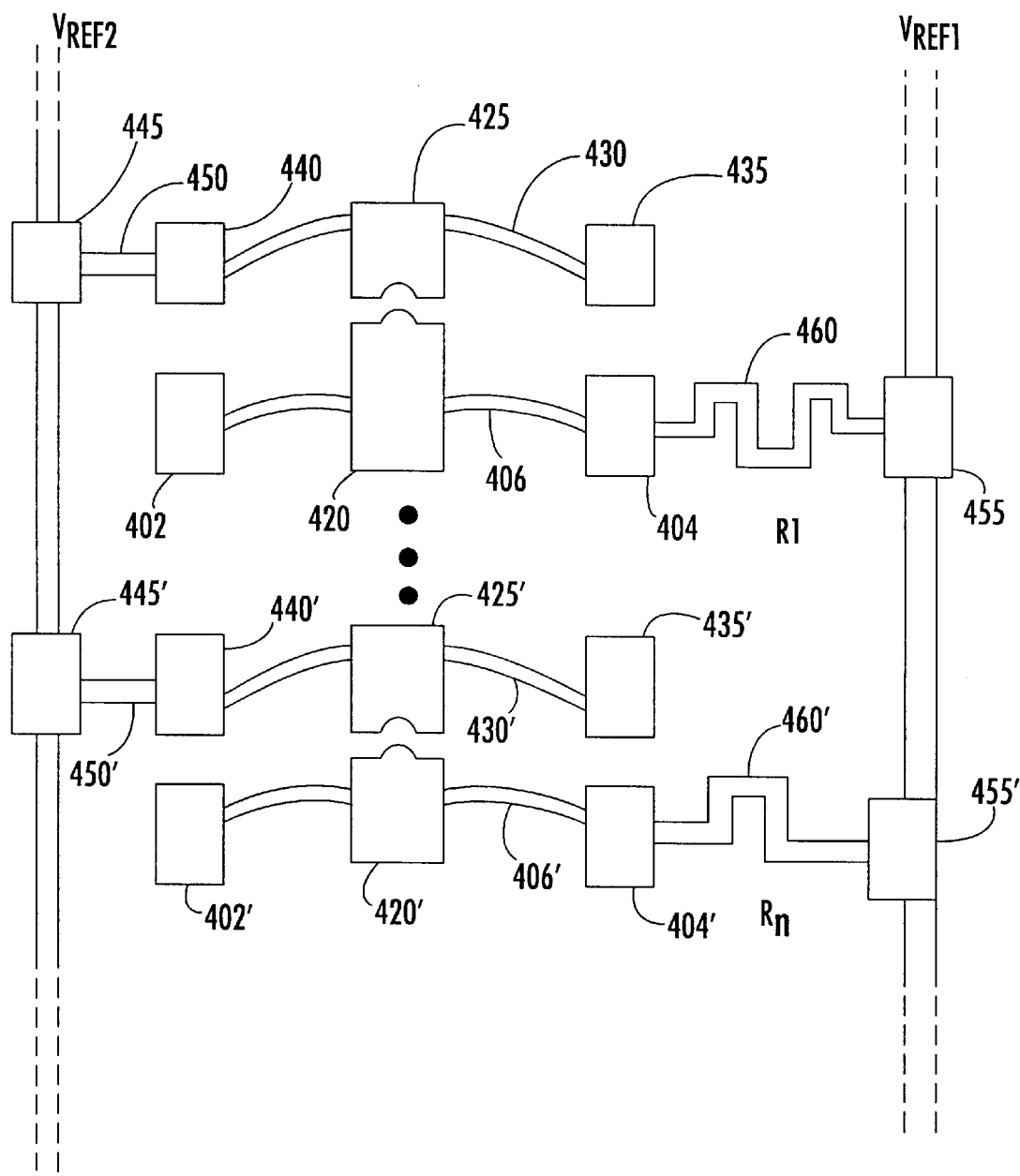

Referring now to FIGS. 4A and 4B, a resistor array according to an embodiment of the present invention will now be further described. FIG. 4B illustrates a plurality of switched resistor elements ($R_I$ through $R_n$) while FIG. 4A provides further detail focused on a single resistor element. While the illustration of FIG. 4A illustrates only a single switch and resistor element of the resistor array 105, it is to be understood that each of the plurality of selectable resistors in the resistor array 105 may be implemented in a manner substantially identical to that illustrated in FIG. 4A as shown in FIG. 4B. For the description herein, the reference numbers of FIG. 4A will be identified but it is to be understood that the description further applies to the correspondingly numbered elements shown in FIG. 4B. Of course, it is further to be understood that the film resistor for each of the resistors in the resistor array may differ to provide for the desired stepping of resistance values. All of the film resistors are preferably fabricated from a single resistive material layer in the integrated circuit device. Of course, as the layer generally has a common sheet rho value, a different routing and/or length will be expected for each resistor value.

As shown in FIGS. 4A and 4B, the selectable resistor element includes a thermal arched beam MEMS actuator/switch 401. The MEMS actuator/switch is formed on an integrated circuit substrate 100 and includes spaced apart supports (or anchors) 402, 404 on the integrated circuit substrate 100. An arched beam 406 of width W and length L extends between the spaced apart supports 402, 404. Alternatively, multiple arched beams may be provided. The arched beam 406 may be fabricated, for example of metal, silicon or other material that has a positive coefficient of thermal expansion, so that it expands upon application of heat thereto. As shown in FIG. 4A, the arched beam 406 is arched in a direction 408 that preferably extends parallel to the integrated circuit substrate 100. Thus, upon application of heat thereto, further displacement of the arched beam 406 between the spaced apart supports 402, 404 in the direction 408 is produced. Heat may be applied by passing a current directly through the beam 406 but is preferably provided by means of heater 410. The heater 410 may be adjacent the substrate 100 or may be a floating heater that is spaced apart from the substrate and anchored thereto by heater anchors 412, 414. The spacing may be provided by trenching a selected region of the underlying integrated circuit substrate 100 to thereby provide an air gap which may facilitate thermal isolation between the heater element 410 and the integrated circuit substrate 100 to thereby potentially improve performance.

The arched beam 406 when activated moves the first switch contact 420, which is attached to the arched beam 406 and free to move therewith, from the illustrated open position to a closed position in which it is in contact with the second switch contact 425 by moving the first switch contact 420 in the direction illustrated by the arrow 408. In the embodiment shown in FIG. 4A, the second switch contact 425 is also mounted on an arched beam 430 which is suspended between a first support (or anchor) 435 and a second spaced apart support 440. Alternatively, the second contact 425 may be nonmoveable with reference to the integrated circuit substrate 100. The use of a second arched beam 430 for mounting of the second contact 425 may beneficially provide for ambient temperature variability tolerance in the microrelay switch by maintaining a respective gap between the first contact 420 and the second contact 425 of the switch which does not significantly vary with ambient temperature.

The embodiments of FIG. 4A further includes a first input/output contact 445 electrically connected to the second spaced apart support 440 of the second contact 425 through a connection 450. A second input/output contact 455 is coupled to the second support 404 of the arched beam 406 through a resistor 460. The resistor 460 corresponds to one of the resistors of the resistor array 105 of FIG. 1 and the resistor 215, 315 respectively of FIG. 2 and FIG. 3.

In the illustrated embodiments of FIGS. 4A and 4B, the resistor 460 is implemented through the use of a doped polysilicon thin film resistor. Similarly, the heater 410 is implemented using the doped polysilicon layer used to define the resistor 460. Accordingly, the structure associated with the microrelay switch and the resistor array may be readily integrated on a single integrated circuit substrate. It is further to be understood that the polysilicon sheet rho and number of resistor squares will determine the resistor value of the resistor 460. Sheet rho may be determined by doping of the polysilicon via implantation, diffusion and/or annealing procedures during the formation of the resistor array device. It is generally understood that providing the resistance through these known procedures can be expected to provide resistor values within 5% of the target value. Furthermore, resistor square count may be determined by the geometry of individual resistors 460. Individual resistors 460 may include matched polysilicon resistor elements connected in series or parallel, depending upon the desired resistance value and the geometric constraints in the design of the integrated circuit device. Resistor geometry is generally determined lithographically and is, therefore, generally able to provide tight control of resistor to resistor variation among like resistors. Similarly, variation in target resistance ratios among sequential resistors within a network may be small providing for the desired resistor ratio structure for the resistor array device.

Figure 5A:
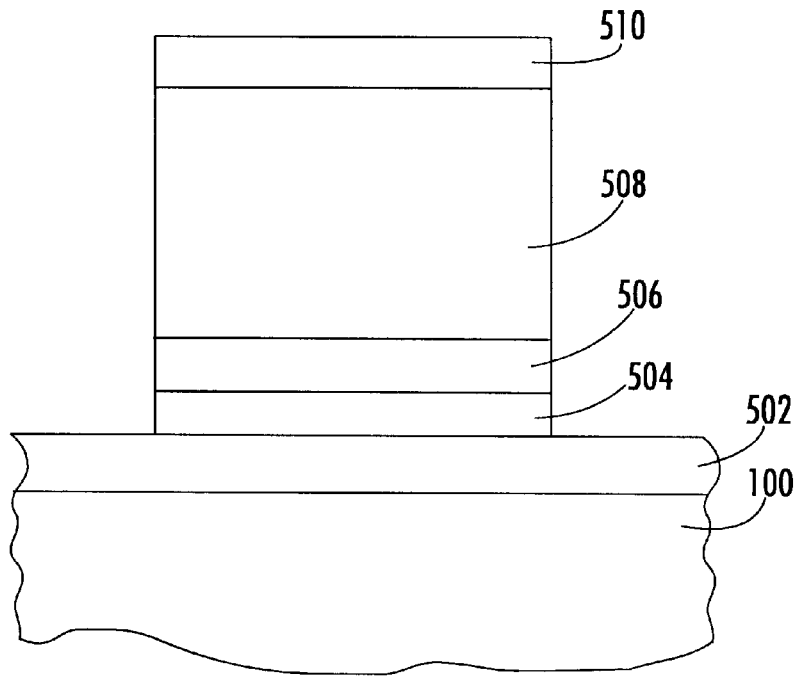
FIGS. 5A through 5D are side cross-sectional views, respectively, of various aspects of the embodiments of the present invention of FIG. 4 illustrating fabrication of a resistor network according to an embodiment of the present invention.

The structure of various features of the embodiments illustrated in FIGS. 4A and 4B will now be further described with reference to the cross sectional drawings in FIGS. 5A–5D. It is to be understood that the features shown in FIGS. 5A–5D, as well as in FIGS. 4A and 4B, are exaggerated for the purposes of explanation and may not accurately represent the relative thicknesses or width of the respective features shown therein. Referring now to FIG. 5A, a cross section of the anchor or support 404 will be further described. Each of the respective layers is provided on an integrated circuit substrate 100. The integrated circuit substrate 100 may, for example, be silicon. A dielectric layer 502 is provided on the integrated circuit substrate 100. The dielectric layer 502 may, for example, be silicon nitride ($Si_3N_4$), silicon dioxide ($SiO_2$) or $Si_3N_4/SiO_2$. An adhesion layer 504, such as cromium (Cr) is provided on the layer 502. A plating seed layer 506, for example, copper (Cu), is then formed on the cromium layer 504. The bulk of the structure of the support 404 in layer 508 is preferably formed from nickel (Ni). Finally, a good conductivity layer 510, such as gold (Au), is formed on the nickel layer 508.

Figure 5B:
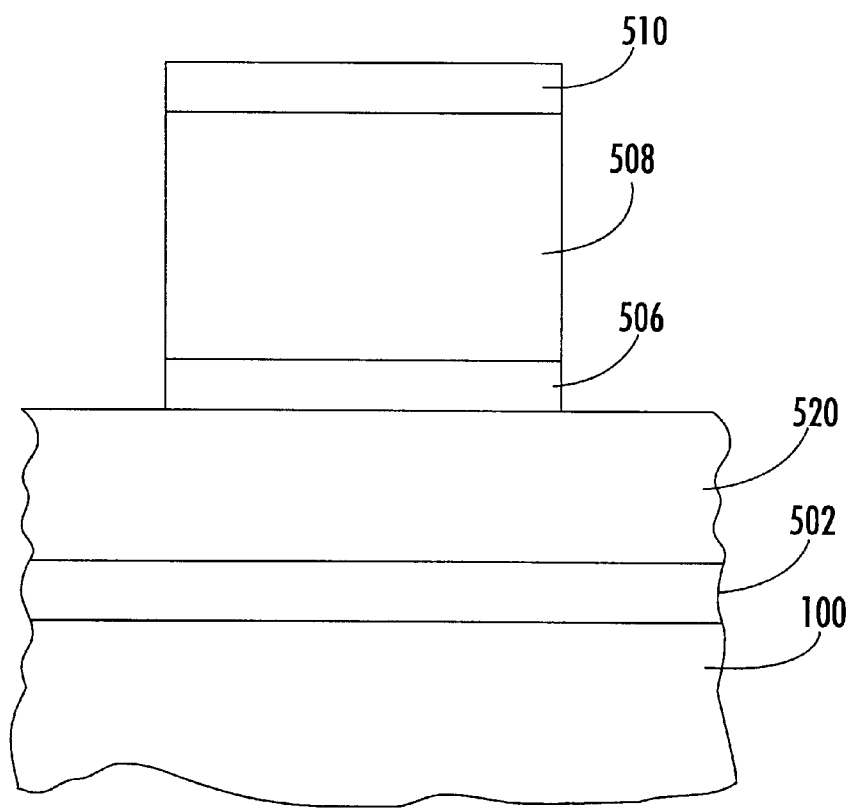

Referring now to FIG. 5B, a cross-sectional illustration showing the arched beam 406 will now be described. As is apparent from reference to FIG. 5B, in the subsequent figures the various structures of the device of the present invention may beneficially utilize common layers in fabrication of various features of the resistor array devices of the present invention. Accordingly, to simplify understanding and to further illustrate the advantages in fabrication provided by the present invention where a common layer may be used to form the various features, the same reference numbers as previously discussed will be used herein. Furthermore, it is to be understood that the discussion regarding such features, including their potential materials, generally applies to each of the figures from FIGS. 5A–5D.

The only additional layer shown in FIG. 5B is the sacrificial layer 520. The sacrificial layer 520 is present during the fabrication process to allow formation of the subsequent layers 506, 508, 510 but is ultimately provided so as to be later removed to allow the arched beam 406 to be a free floating structure 506, 508, 510 displaced from the integrated circuit substrate 100 and free to move with respect thereto. The arched beam 406 is free, once fabricated, to move in the direction which would be from left to right in FIG. 5B to provide for activation of the microrelay switch by bringing the respective first contact 420 and second contact 425 into electrical contact. Furthermore, for latching embodiments, the arched beam structure 506, 508, 510 is further moveable in the direction towards the integrated circuit substrate 100 in reference to FIG. 5B when the arched beam 406 is latched electrostatically to the integrated circuit substrate 100. The sacrificial layer 520 may, for example, be formed from silicon oxide or phosphosilicate glass (PSG).

Figure 5C:
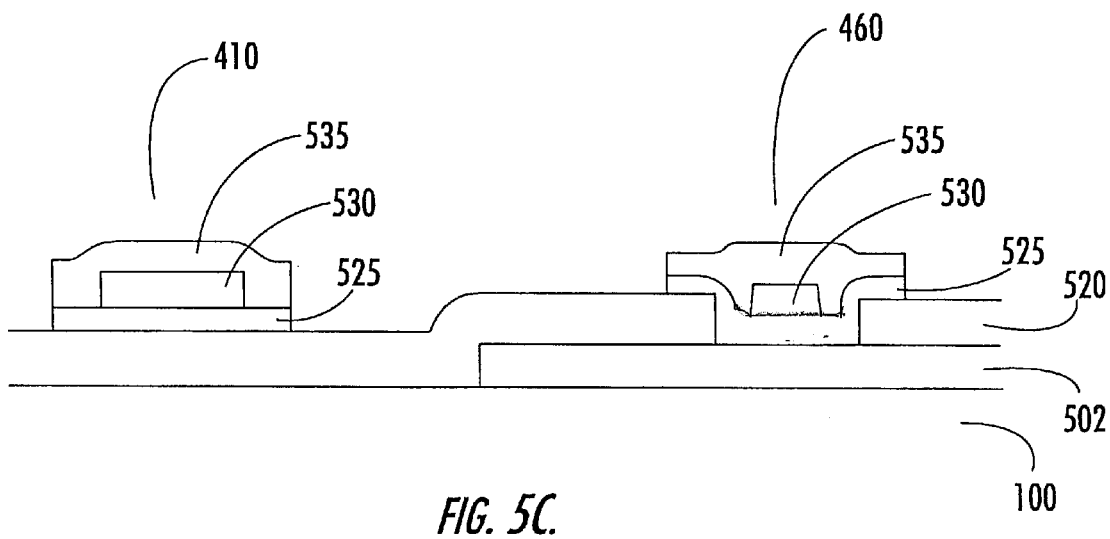

Referring now to FIG. 5C, the respective resistive element structures, including the heater 410, shown on the left side of FIG. 5C, and the resistor 460, shown on the right side of FIG. 5C, will now be described. It is to be understood that, while the views of the respective left and right halves of FIG. 5C are not necessarily taken looking in the same direction, they accurately represent the relevant layers of each of the respective features. As shown in FIG. 5C, both of the resistive elements 410, 460 include a resistive material layer 530, such as a doped polysilicon. The doped polysilicon layer 530 is sandwiched between insulating layers 525, 535 which may be formed from silicon nitride ($Si_3N_4$). However, the structure on the left side corresponding to the heater 410 is shown as being formed on the sacrificial layer 520. Accordingly, the embodiment of FIG. 5C shows a heater 410 which may be suspended over a trench region to provide thermal isolation between the heater 410 and the integrated circuit substrate 100 as an air gap will be formed when the sacrificial layer 520 is removed. Furthermore, the trench is preferably provided at a greater depth by etching or other known procedures for cutting into the integrated circuit substrate layer 100 to provide further thermal isolation.

Figure 5D:
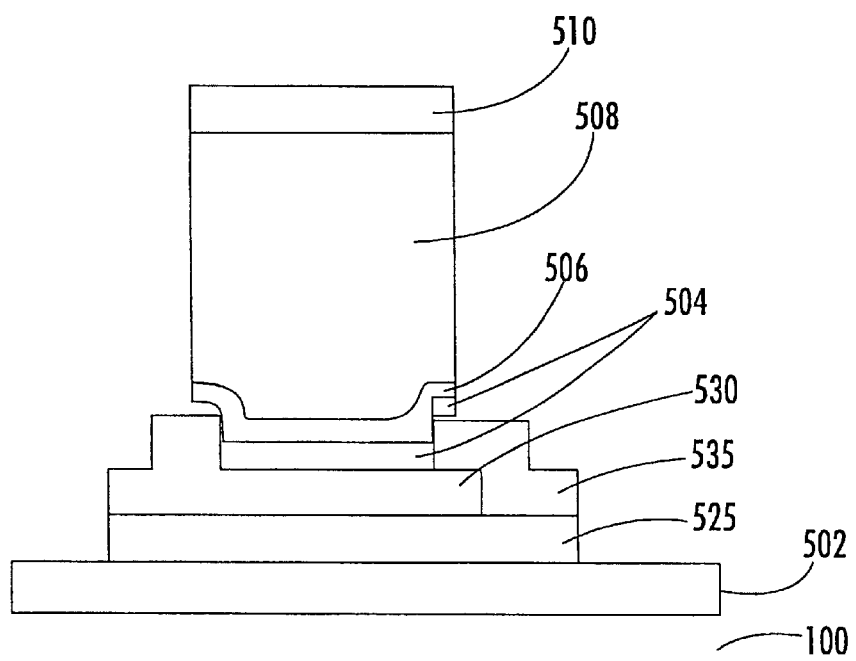

Referring now to FIG. 5D, a contact 455 to the resistor 460 will now be described. As can be seen by comparison of FIG. 5D and FIG. 5A, the structures of the contact 455 and the support 404 are substantially similar. In fact, as the support 404 further acts as an electrical contact connecting the end of the resistor 460 opposite the contact 455 to the arched beam 406 and, thereby to the first switch contact 420, the support 404 in practice, includes a region therein which is substantially identical to the structure shown in FIG. 5D. The respective layers serve the same function as described previously with respect to FIGS. 5A–5C. However, FIG. 5D further illustrates the etching away of the upper layer 535 to allow for an electrical contact between the polysilicon layer 530 and the nickel layer 508 and the gold layer 510.

Methods for fabricating resistor arrays according to the present invention will now be further described with reference to FIGS. 6A–6E. Generally, a resistive material layer is formed on an integrated circuit substrate defining a reference plane, the resistive material layer defining a heater associated with a thermal relay and further defining the plurality of resistors of the resistor array. A conductive layer may be formed on the integrated circuit substrate to define anchors associated with the thermal relay and further to define a moving switch element of the thermal relay. A contact layer may further be formed on the resistive material layer and electrically connected to the resistive material layer to provide for electrical connection to the resistive material layers and the structures defined therein. As the methodology for forming each of the respective layers is generally known to those of skill in the art, it will not be further described herein.

Referring now to the particular embodiments illustrated in FIG. 6A–6E, operations related to forming a resistive material layer defining a heater associated with a thermal relay and further defining the plurality of resistors of the resistor array will now be further described. Note that, in the illustrations of the figures, embodiments providing for thermal isolation below at least a portion of the heater element are illustrated. In particular, referring to FIG. 6A, a sacrificial layer 602 is initially formed on the integrated circuit substrate 100. The sacrificial layer 602 is provided, as will be subsequently described, to allow inclusion of an air gap below at least a portion of the heater element and may be omitted while still practicing the present invention.

Figure 6A:
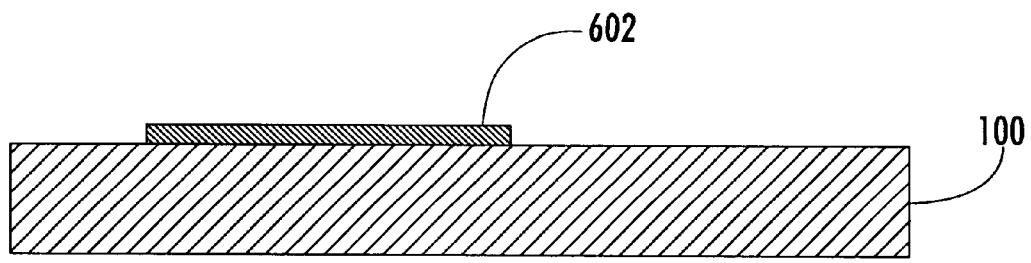
FIGS. 6A through 6E are side cross-sectional views of resistor networks during intermediate fabrication steps according to embodiments of the present invention.
Figure 6B:
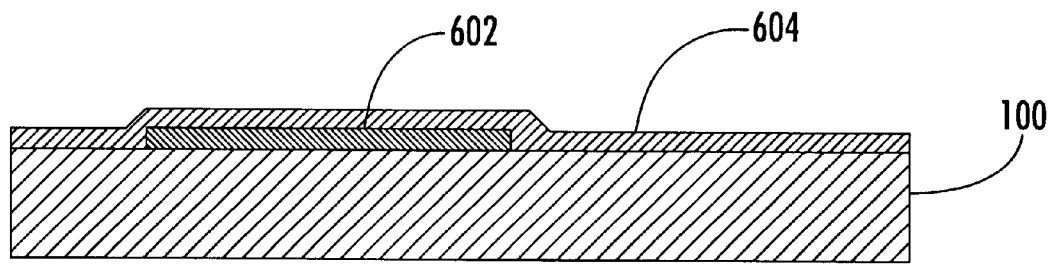
Figure 6C:
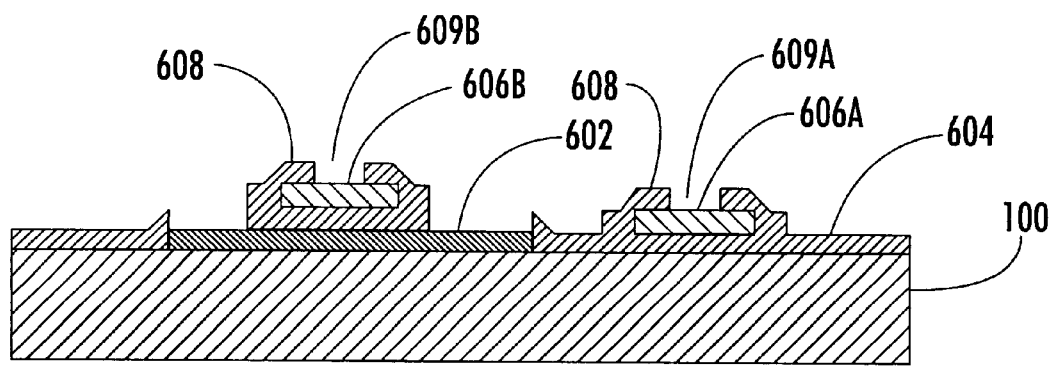

Referring now to FIG. 6B, a first dieletric layer 604 is formed on the substrate 100 and the sacrificial layer 602. As shown in FIG. 6C, a patterned layer comprising a resistive material layer is formed on the first dieletric layer in desired locations. More particularly, as shown in FIG. 6C, a first resistive layer region 606a in the patterned layer defines a resistor for inclusion in the resistor array and a second resistive layer region 606b in the patterned layer defines a heater element associated with a thermal relay.

At least two methods may be used to form the patterned layer comprising resistive material. In a first method, a layer comprising resistive material is blanket formed, for example, by blanket deposition, and then patterned using conventional photolithographic techniques to define the first and second resistive layer regions 606a and 606b respectively. In another method, a patterned lift-off layer is formed on those regions where the patterned layer comprising resistive material is not desired. A blanket layer comprising resistive material then is formed. The patterned lift-off layer then is lifted off the substrate, using conventional lift-off techniques, so that the first and second resistive layer regions 606a and 606b remains. Other conventional techniques also may be used.

Still referring to FIG. 6C, a second dielectric layer 608 is formed on the resistive layer regions 606a, 606b. In addition, vias 609a, 609b are provided through the second dieletric layer 608 thereby providing access to the resistive layers 606a, 606b. It is further to be understood that, as shown in the cross-sectional illustration of FIG. 6C, a portion of the first dielectric layer 604 overlying the sacrificial layer 602 is removed.

Figure 6D:
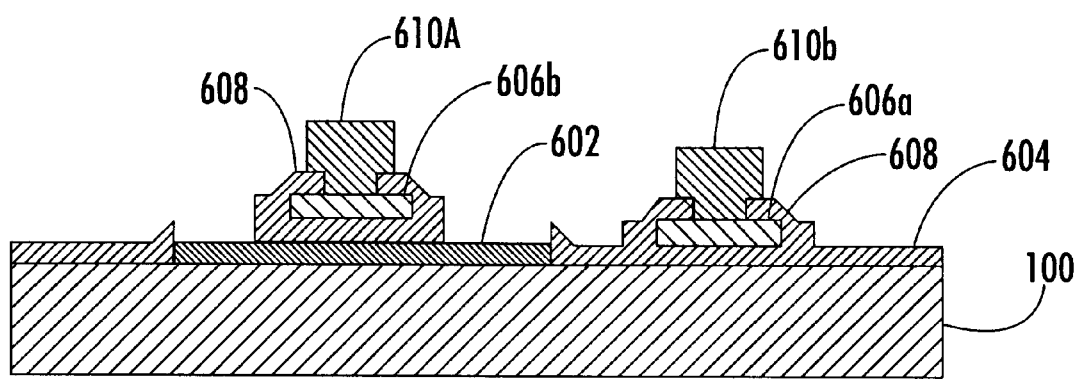
Figure 6E:
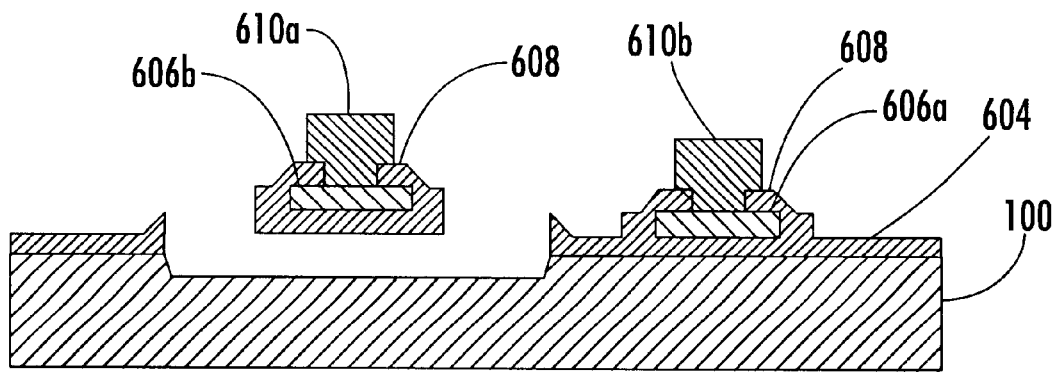

Referring now to FIG. 6D, contact mettalization regions 610a, 610b are formed on the second dielectric layer 608 and further passing through the vias 609a, 609b to provide conductive contact with the underlying resistive layer regions 606a, 606b respectively. Finally, as illustrated in FIG. 6E, the sacrificial layer 602 has been removed. A thermal insulation region below the heater element 606b may thereby be provided by further etching of the substrate 100.

In one embodiment of the present invention, a 16 channel digital potentiometer on a single chip is provided having a die footprint of approximately four millimeters by ten millimeters. Bond pads are arranged along both long edges of the die. The die may then be fit into a standard 22—pin dual in line package (DIP) configuration. Suitable pinouts for both a monostable and latching embodiment of such a device are provided in Table 1 and Table 2 respectively. Exemplary performance specifications for such embodiments are provided in Table 3.

TABLE 1

| Pin Number | Function | Values |
|---|---|---|
| 1,11 | Vref1 | 10 mA max. |
| 12,22 | Vref2 | 0V or ground |
| 2–9 | Select inputs for $R_0$–$R_7$ | ON = 5V OFF = 0V max current = 25mA |
| 14–21 | Select inputs for $R_8$–$R_{15}$ | ON = 5V OFF = 0V max current = 25mA |
| 10,13 | Global control reference voltage | 0V or ground |

TABLE 2

| Pin Number | Function | Values |
|---|---|---|
| 1 | Vref1 | 10 mA max. |
| 22 | Vref2 | 0V or ground |
| 2–9 | Select inputs for $R_0$–$R_7$ | ON = 5V OFF = 0V max current= 25mA |
| 14–21 | Select inputs for $R_8$–$R_{15}$ | ON = 5V OFF = 0V max current= 25mA |
| 10,13 | Global control reference voltag | 0V or ground |
| 11 | Global latch input1 | +15V |
| 12 | Global latch input2 | −15V |

TABLE 3

| Parameter | Value |
|---|---|
| Number of resistor channels | 16 |
| Base resistance (R) | 24–240Ω |
| Switching control voltage | ≤V |
| Latching voltage | +/−15V (30V total range) |
| Leakage channel to channel | <1 pA |
| Leakage channel to control circuit | <1 pA |
| Min. Network to control isolation | 42.4V |
| Max. network current | 10 mA |
| Operating frequency | DC to 100 kHz |

One type of MEMS device suitable for use with the present invention in the switch array 110 is described in U.S. Pat. No. 5,909,078 entitled Thermal Arched Beam Microelectromechanical Actuators to Wood et al., the disclosure of which is hereby incorporated herein by reference. Disclosed is a family of thermal arched beam microelectromechanical actuators that includes an arched beam which extends between spaced apart supports on an integrated circuit substrate. The arched beam expands upon application of heat thereto. Means are provided for applying heat to the arched beam to cause further arching of the beam as a result of thermal expansion thereof, to thereby cause displacement of the arched beam.

When used as a microelectromechanical actuator, thermal expansion of the arched beam can create relatively large displacement and relatively large forces while consuming reasonable power. A coupler can be used to mechanically couple multiple arched beams. Thermal arched beams can be used to provide actuators, relays, sensors, microvalves and other MEMS devices. Other thermal arched beam microelectromechanical devices suitable for use with the present invention and associated fabrication methods are described in U.S. Pat. No. 5,994,816 (application Ser. No. 08/936,598) to Dhuler et al. entitled Thermal Arched Beam Microelectromechanical Devices and Associated Fabrication Methods, the disclosure of which is hereby incorporated herein by reference. In addition, a suitable MEMS device including a dielectric link is described in application Ser. No. 09/336,933 to Wood entitled Dielectric Links for Microelectromechanical Systems and Associated Fabrication Methods, the disclosure of which is hereby incorporated herein by reference.

Resistor array element structures according to the present invention may be integrated into existing MEMS fabrication processes, such as the well known LIGA and MUMPS fabrication processes. Moreover, for the embodiments of the present invention utilizing a thermal arched beam, multiple beams may be coupled together to provide increased force and/or increased efficiency.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An integrated circuit resistor network comprising:
a plurality of resistors;
a plurality of switches, each of the switches being electrically coupled in series with an associated one of the plurality of resistors;
a plurality of microelectromechanical actuators, each of the microelectromechanical actuators being coupled to one of the plurality of switches; and
a controller electrically coupled to the plurality of microelectromechanical actuators that selectively activates at least one of the plurality of microelectromechanical actuators to toggle the associated one of the switches coupled to the at least one of the plurality of microelectromechanical actuators; and
wherein the microelectromechanical actuators are thermal relays including a heater element comprising a region of a resistive material on an integrated circuit substrate and wherein the plurality of resistors are film resistors each comprising a region of the resistive material on the integrated circuit substrate.

2. A resistor network according to claim 1 further comprising a layer of resistive material on the integrated circuit substrate wherein the plurality of resistors comprise a first portion of the layer of resistive material and wherein the heater elements comprise a second portion of the layer of resistive material.

3. A resistor network according to claim 2 wherein the resistive material comprises polysilicon.

4. A resistor network according to claim 3 wherein the film resistors are thin film resistors and the resistive material is doped polysilicon.

5. A resistor network according to claim 4 wherein respective ones of the plurality of resistors have a resistance value stepped by a factor of two from another of the plurality of resistors.

6. A resistor network according to claim 5 wherein each of the plurality of resistors provides a set of associated resistance values stepped by factors of two from a base resistance value.

7. A resistor network according to claim 6 wherein the base resistance value is between about 20 ohms and about 300 ohms.

8. A resistor network according to claim 4 wherein each of the doped polysilicon film resistors comprises a number of resistor squares of a polysilicon sheet having a sheet resistance value (rho) so as to provide a desired resistance value.

9. A resistor network according to claim 8 wherein at least one of the plurality of resistors includes a plurality of matched polysilicon resistor elements.

10. An integrated circuit resistor network comprising:
an integrated circuit substrate;
a plurality of resistors on the integrated circuit substrate;
a plurality of switches on the integrated circuit substrate, each of the switches being electrically coupled in series with an associated one of the plurality of resistors;
a plurality of microelectromechanical actuators, each of the microelectromechanical actuators comprising spaced apart supports on the integrated circuit substrate and a beam that extends between the spaced apart supports and that expands upon application of heat thereto to thereby cause displacement of the beam between the spaced apart supports and each of the microelectromechanical actuators being coupled to one of the plurality of switches; and
a controller electrically coupled to the plurality of microelectromechanical actuators that selectively activates at least one of the plurality of microelectromechanical actuators to toggle the associated one of the switches coupled to the at least one of the plurality of microelectromechanical actuators.

11. A resistor network according to claim 10 wherein the integrated circuit substrate defines a reference plane and wherein the beam comprises an arched beam which extends between the spaced apart supports and which expands upon application of heat thereto for movement parallel to a reference plane defined by said integrated circuit substrate and wherein the thermal relays further comprise:
a heater disposed on the integrated circuit substrate so as to underlie said arched beam and to be spaced apart from said arched beam, said heater adapted to heat the ambient surrounding the arched beam which, in turn, heats the arched beam to cause further arching of the beam as a result of thermal expansion thereof, to thereby cause displacement of the arched beam parallel to the reference plane defined by said integrated circuit substrate.

12. A resistor network according to claim 11 wherein the controller is coupled to the heater of each of the thermal relays to initiate heating of the arched beams so as to activate the corresponding one of the plurality of microelectromechanical actuators.

13. A resistor network according to claim 12 wherein the controller outputs a select pulse that generates a current flow to activate the at least one of the plurality of microelectromechanical actuators and wherein the resistor network further comprises a latch circuit that maintains the activated at least one of the plurality of microelectromechanical actuators in an activated position.

14. A resistor network according to claim 13 wherein the latch circuit outputs an electrostatic holding voltage that maintains the activated at least one of the plurality of microelectromechanical actuators in the activated position.

15. A resistor network according to claim 14 wherein the latch circuit includes a capacitor associated with each of the plurality of microelectromechanical actuators and wherein the controller has a plurality of latch outputs each of which is electrically coupled to one of the capacitors that initiates charging of the associated one of the capacitors to thereby output the electrostatic holding voltage.

16. A resistor network according to claim 15 wherein the heater of each of the thermal relays comprises a region of a resistive material on an integrated circuit substrate and wherein the plurality of resistors are film resistors comprising a region of the resistive material on the integrated circuit substrate.

17. A digital potentiometer integrated on an integrated circuit substrate comprising:
a plurality of film resistors on the integrated circuit substrate;
a plurality of microrelay switches on the integrated circuit substrated;
a respective resistor and switch being coupled between first and second reference terminals of the digital potentiometer; and a control circuit that selectively activates one of the plurality of microrelay switches to provide a desired resistance between the first and second reference voltage pins of the digital potentiometer; and wherein the microrelay switches are thermal relays including a heater element comprising a region of a resistive material on the integrated circuit substrate and wherein the plurality of film resistors each comprise a region of the resistive material on the integrated circuit substrate.

18. A digital potentiometer according to claim 16 further comprising a layer of resistive material on the integrated circuit substrate wherein the plurality of resistors comprise a first portion of the layer of resistive material and wherein the heater elements comprise a second portion of the layer of resistive material.

19. A digital potentiometer according to claim 18 wherein the control circuit is coupled to a selection input of the digital potentiometer that designates one of the plurality of microrelay switches to activate.

20. A digital potentiometer according to claim 19 wherein at least one of the microrelay switches further comprises:

a first contact electrically coupled to a second end of an associated one of the plurality of thin film resistors, the second end being opposite a first end of the associated one of the plurality of thin film resistors that is coupled to the first reference terminal;

a second contact electrically coupled to the second reference terminal;

a third contact having a first position contacting the first and second contact and a second position displaced from the first and second contact;

a thermal arched beam microelectromechanical actuator coupled to the third contact and having a first position in which the third contact is in its first position and a second position in which the third contact is in its second position; and wherein the heater element heats the thermal arched beam to move it between its first and second positions.

21. A digital potentiometer according to claim 20 wherein the first position of the thermal arched beam microelectromechanical actuator is an activated position and further comprising an electrostatic latch circuit that latches activated ones of the plurality of thermal arched beam microelectromechanical actuators in the activated position and wherein the control circuit further comprises a latch control output coupled to the electrostatic latch circuit that designates one of the plurality of thermal arched beam microelectromechanical actuators to be latched.

22. A microelectromechanical structure including a resistor array comprising:

an integrated circuit substrate;

a plurality of thermal actuators on the integrated circuit substrate; and a resistive layer on the integrated circuit substrate defining a plurality of heaters, each of the heaters being associated with one of the plurality of thermal actuators and further defining a plurality of resistors of the resistor array, the plurality of resistors being electrically coupled to the thermal actuators.

23. A microelectromechanical structure according to claim 22 further comprising:

a conductive layer on the integrated circuit substrate defining anchors associated with the thermal actuators and further defining moving switch elements of the thermal actuators; and a contact layer on the resistive layer and electrically connected to the resistive layer.

24. A microelectromechanical structure according to claim 23 further comprising a trench between the heater and the integrated circuit substrate that provides thermal isolation therebetween.

25. A microelectromechanical structure according to claim 23 wherein at least one of the moving switch elements comprises an arched beam that extends between a first and a second of the anchors and wherein the heater underlies and is spaced apart from the arched beam.

26. A microelectromechanical structure according to claim 22 wherein the resistive layer comprises polysilicon.

27. A resistor network according to claim 1 wherein the plurality of resistors and the plurality of switches are coupled between first and second reference terminals.

* * * * *